United States Patent
Ho et al.

(10) Patent No.: US 6,885,403 B2
(45) Date of Patent: Apr. 26, 2005

(54) COLOR SEPARATION BEAM SPLITTER FOR PROJECTORS

(75) Inventors: Fang Chuan Ho, Hsinchu (TW); Cheng-Wei Chu, Taipei Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 975 days.

(21) Appl. No.: 09/749,389

(22) Filed: Dec. 28, 2000

(65) Prior Publication Data

US 2002/0008770 A1 Jan. 24, 2002

(30) Foreign Application Priority Data

May 16, 2000 (TW) ........................................ 89109333 A

(51) Int. Cl.⁷ ................................................ H04N 9/07
(52) U.S. Cl. ..................... 348/336; 348/337; 348/339; 348/336; 359/831; 359/833; 353/33
(58) Field of Search ................................ 348/335, 336, 348/337, 338, 265, 262; 353/21, 30, 33, 20; 359/634, 831, 438, 514, 832, 833, 834, 835, 836, 837, 239.2; 356/239.2; 257/440; H04N 09/097

(56) References Cited

U.S. PATENT DOCUMENTS

| | | | | | |
|---|---|---|---|---|---|
| 4,323,918 A | * | 4/1982 | Bendell | ...................... | 348/337 |
| 4,334,238 A | * | 6/1982 | Morishita et al. | ........... | 348/265 |
| 4,507,679 A | * | 3/1985 | Bendell | ...................... | 348/238 |
| 4,725,880 A | * | 2/1988 | Dischert | ...................... | 348/337 |
| 4,803,523 A | * | 2/1989 | Pearson | ........................ | 355/32 |
| 4,873,569 A | * | 10/1989 | Hirosawa | ..................... | 358/511 |
| 5,436,661 A | * | 7/1995 | Yamamoto et al. | ......... | 348/264 |
| 5,754,260 A | * | 5/1998 | Ooi et al. | ...................... | 349/10 |
| 5,777,373 A | * | 7/1998 | Groenig | ....................... | 257/495 |
| 5,777,673 A | | 7/1998 | Yoshikawa | | |
| 5,777,674 A | * | 7/1998 | Ohmuro | ...................... | 348/338 |
| 6,053,615 A | * | 4/2000 | Peterson et al. | .............. | 353/20 |
| 6,317,205 B1 | * | 11/2001 | Merklein | ................. | 356/239.2 |
| 6,549,338 B1 | * | 4/2003 | Wolverton et al. | .......... | 359/634 |
| 6,614,478 B1 | * | 9/2003 | Mead | ........................ | 348/337 |
| 2002/0008770 A1 | * | 1/2002 | Ho et al. | ...................... | 348/336 |
| 2003/0227578 A1 | * | 12/2003 | Imahase et al. | ............. | 348/744 |

\* cited by examiner

*Primary Examiner*—Ngoc-Yen Vu
(74) *Attorney, Agent, or Firm*—Birch, Stewart, Kolasch & Birch, LLP

(57) ABSTRACT

A color separation beam splitter for projectors is provided, which comprises a plurality of prisms connected with each other and three optical interference filters having different wavelength ranges respectively formed on side surfaces of the plurality of prisms. The three optical interference filters include a yellow color reflective dichroic mirror, a red color reflective dichroic mirror, and a blue color reflective dichroic mirror to filter out the yellow light and provide three primary color lights with high color purity. Moreover, by reflecting a light beam twice, the number of layers of dichroic mirror can be reduced. The color purity of the light is increased after reflected twice by the dichroic mirrors. Moreover, configuration of a liquid crystal projector by use of this prism assembly as color separation unit is also disclosed.

8 Claims, 9 Drawing Sheets

COLOR SEPARATION BEAM SPLITTER FOR PROJECTORS

BACKGROUND OF THE INVENTION

1. Field of the Invention

This invention relates to a projection display, and more particularly to a color separation beam splitter for projectors.

2. Description of Prior Art

The color purity of three primary color lights obtained by a conventional tri-color separation beam splitter is not satisfactory since the wavelength range of visible light covers a wide gamut. There are many prior arts trying to solve this problem, such as U.S. Pat. No. 4,507,679 issued to Sidney Bendell, U.S. Pat. No. 5,777,674 of Ohmuro and U.S. Pat. No. 5,777,673 of Yoshikawa, etc. Please refer to FIG. 1a. In Bendell's patent ('679), a space layer 2 is formed between two triangular prisms to serve as a total reflection interface for the second reflected beam. Referring to FIGS. 1b and 1c, Ohmuro and Yoshikawa respectively place air gaps 4a, 4b and 6a, 6b between thin film dichroic mirrors to separate a visible light into a red light, a blue light and two green lights. The four-color separation beam splitter can provide three primary color lights with high color purity. However, such a prism assembly is hard to fabricate and has a large volume since it includes two air gaps and three dichroic coatings.

SUMMARY OF THE INVENTION

Accordingly, an object of this invention is to provide a high-purity color separation beam splitter for projectors, which has a simple structure and a low cost.

In order to achieve the above object, the inventors of this invention disclose a color separation beam splitter, which can filter out the wavelength range of yellow light at the front end of the beam splitter to obtain high purity lights of three primary colors. This invention utilizes the mechanism of multi-reflection in the multi-layer thin-film dichroic mirrors to construct a four-color separation beam splitting prism, thus reducing the number of layers of the dichroic beam splitting film and facilitating the fabrication of such a prism. The color separation beam splitter is light and tiny and hence is an appropriate light splitting/combining device for the optical engine of a projection display.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1A:
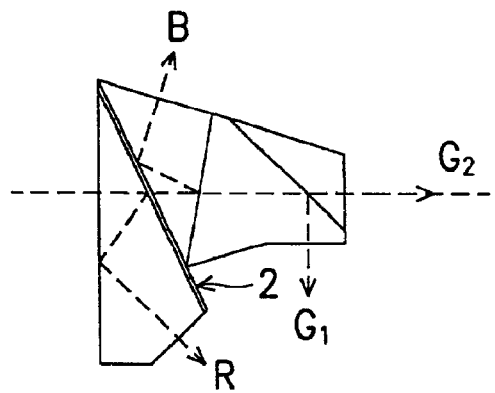
FIG. 1a illustrates the structure of a prior-art color separation beam splitter.
Figure 1B:
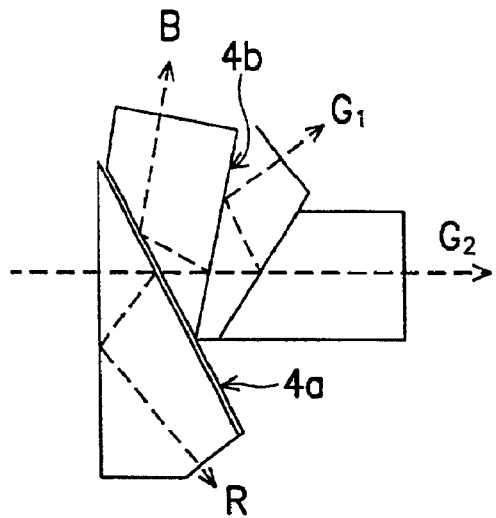
FIG. 1b illustrates the structure of another prior-art color separation beam splitter.
Figure 1C:
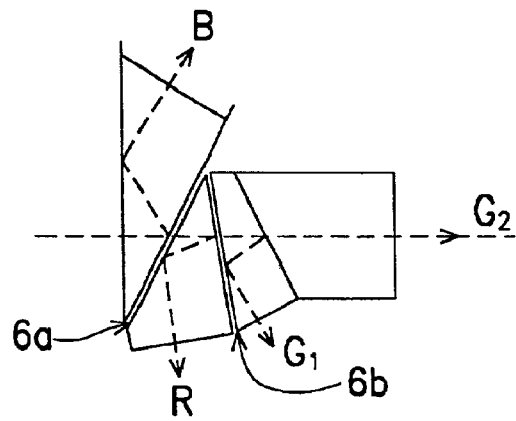
FIG. 1c illustrates the structure of another prior-art color separation beam splitter.
Figure 2A:
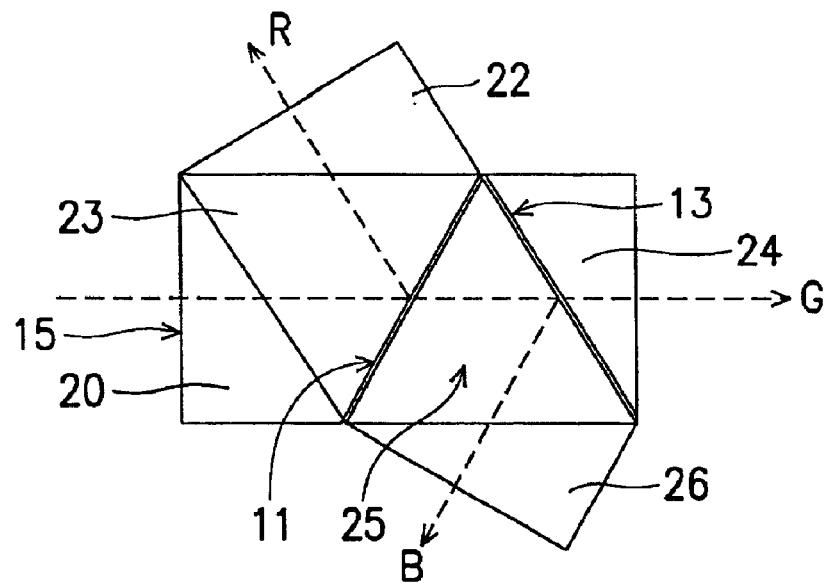
FIG. 2a illustrates the structure of a color separation beam splitter for projectors according to one embodiment of this invention.

Refer to FIG. 2a. According to one embodiment of this invention, the color separation beam splitter includes two kinds of prisms, that is, right-angled prisms 20, 22, 24 and 26 and triangular prisms 23, 25. A red color dichroic mirror 11, which reflects red light and passes blue light and green light, is formed on the surface corresponding to the base angle $\theta_1$ of the triangular prism 23. A blue color dichroic mirror 13, which reflects blue light and passes green light, is formed on the surface corresponding to the base angle $\theta_2$ of the triangular prism 25. The hypotenuses of the right-angled prisms 20, 22, 24 and 26 are respectively adhered to the triangular prisms 23 and 25 which are adhered to each other to form a prism assembly. A yellow color dichroic mirror 15 is formed on the surface of incidence of the light inputting into the prism assembly.

Figure 2B:
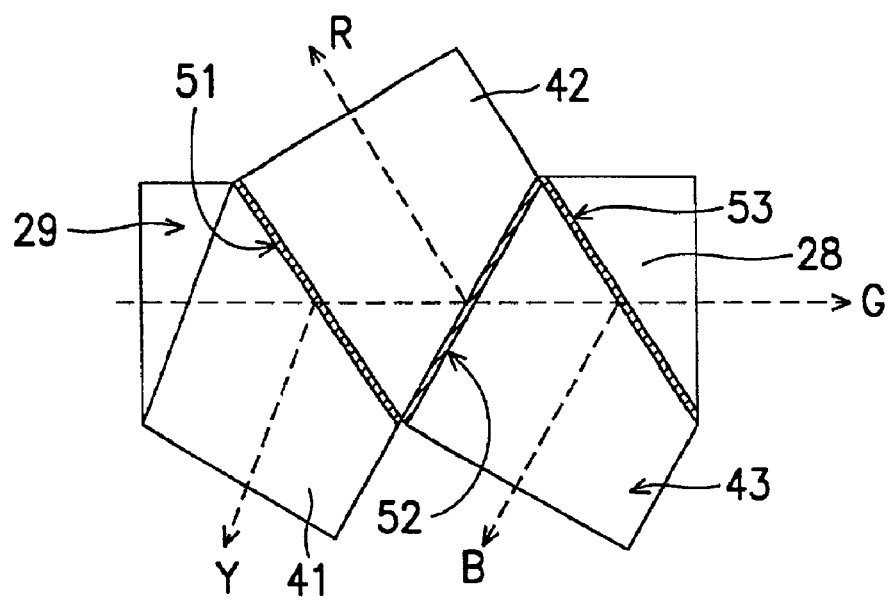
FIG. 2b illustrates the structure of color separation beam splitter for projectors according to another embodiment of this invention.

Refer to FIG. 2b. According to the second embodiment, the color separation prism is made up of three trapezoid prisms 41, 42, 43 and two right-angled prisms 28, 29. Numerals 51, 52, 53 respectively indicate dichroic mirrors of yellow color, red color and blue color. In this embodiment, by virtue of the oblique incidence of the input white light, the energy loss of the light source due to the large bandwidth of the yellow color dichroic mirror can be reduced.

Figure 3A:
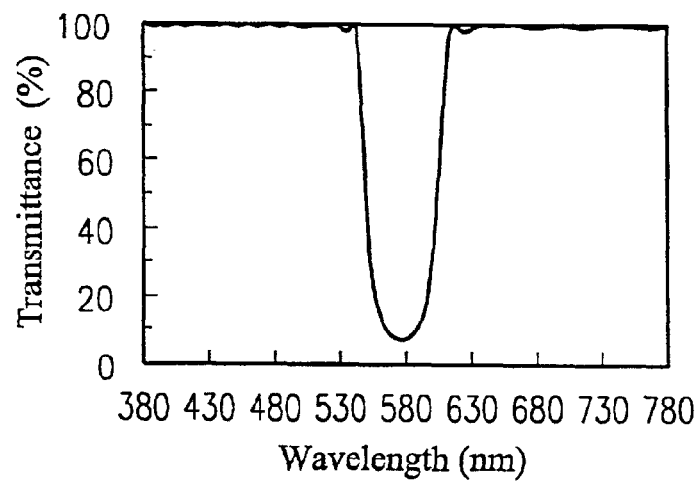
FIG. 3a illustrates the spectrum characteristic of the yellow color reflective mirror used in this invention.

The yellow color dichroic mirror 15 is a multi-layer thin film having a periodic structure of $Al_2O_3/SiO_2$. The refractive indices of $Al_2O_3$ and $SiO_2$ are 1.63 and 1.45, respectively. The layer number of the thin film can be from 37 to 51 which is determined according to the characteristics of the light source such as the intensity and the wavelength range of light source, etc. The spectral characteristics of the yellow color dichroic mirror is as shown in FIG. 3a.

Figure 3B:
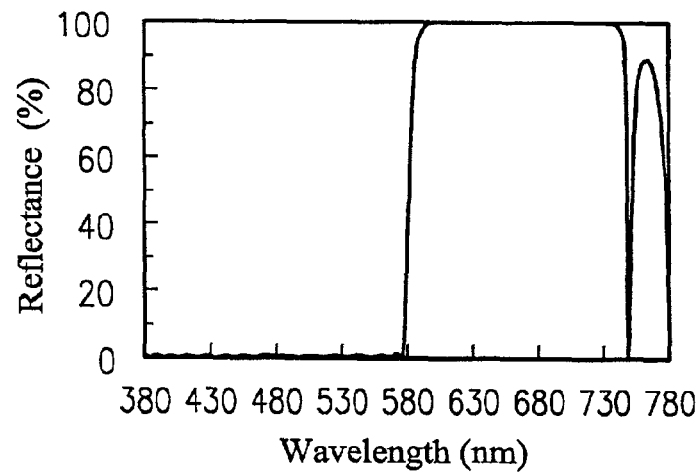
FIG. 3b illustrates the spectrum characteristic of the red color reflective mirror used in this invention.
Figure 3C:
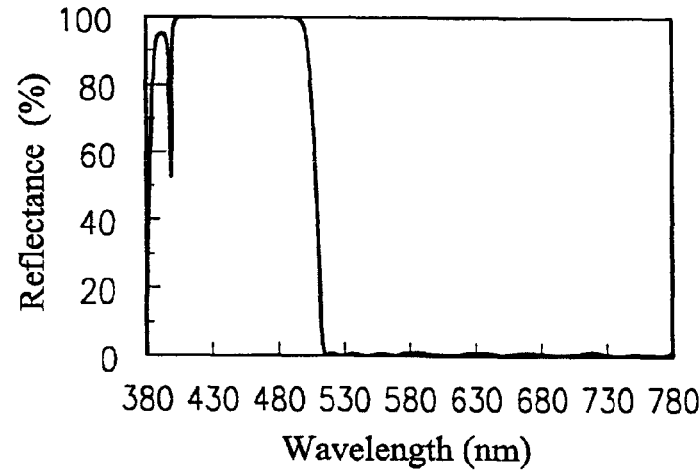
FIG. 3c illustrates the spectrum characteristic of the blue color reflective mirror used in this invention.

Both the red color dichroic mirror 11 and the blue color dichroic mirror 13 have a periodic structure of $TiO_2/SiO_2$, in which the refractive indices of $TiO_2$ and $SiO_2$ are respectively 2.32 and 1.45. Assuming that $\theta_1=\theta_2=60°$, the reflective spectral curves of the red color dichroic mirror 11 and the blue color dichroic mirror 13 are shown in FIG. 3b and FIG. 3c, respectively.

Figure 4A:
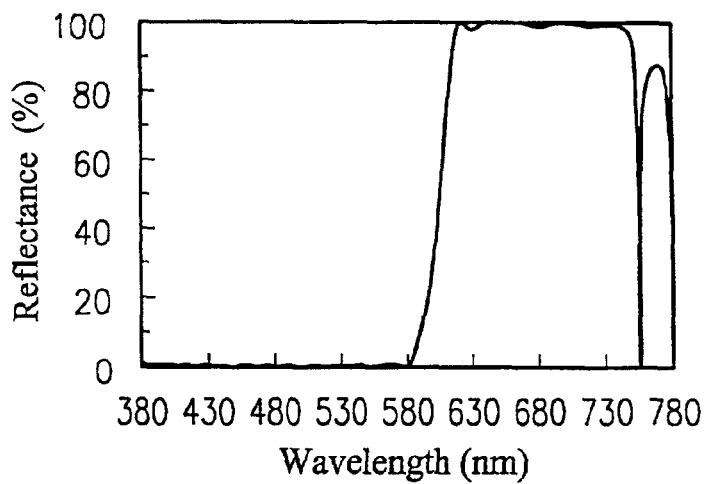
FIG. 4a illustrates the reflective spectral curve of the light passing the yellow color reflective mirror and reflected by the red color reflective mirror in the color separation beam splitter of this invention.
Figure 4B:
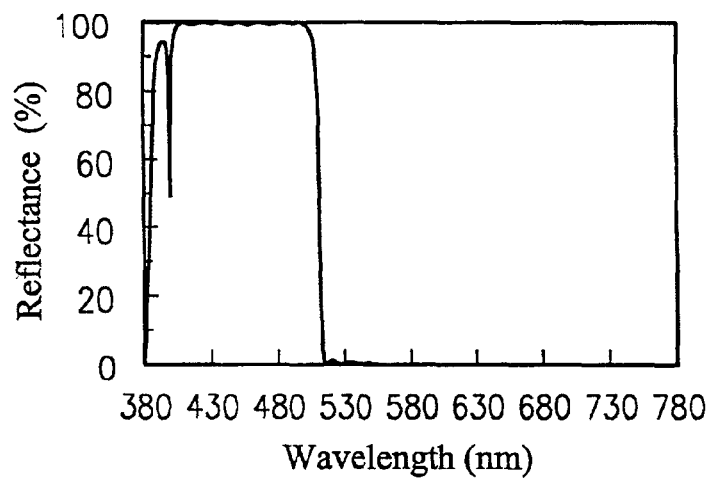
FIG. 4b illustrates the reflective spectral curve of the blue light which passes through the red color reflective mirror and is directed toward and then reflected by the blue and green dichroic mirror in the color separation beam splitter of this invention.
Figure 4C:
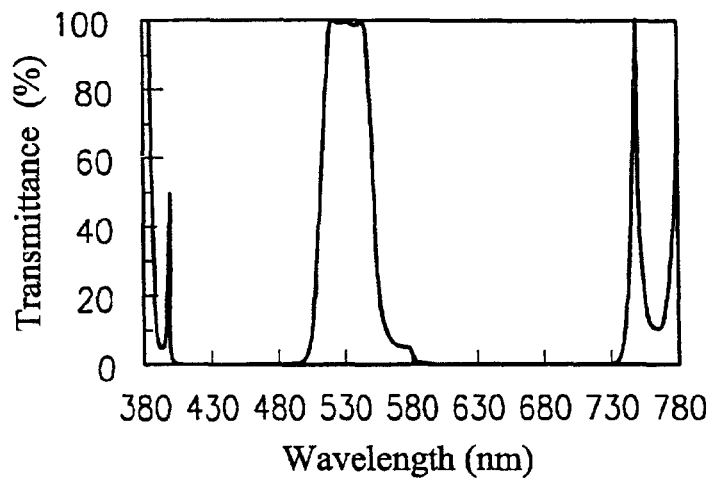
FIG. 4c illustrates the transmissive spectral curve of the green light which passes through the red color reflective mirror and is directed toward and then reflected by the blue and green dichroic mirror in the color separation beam splitter of this invention.

The reflective spectral curve shown in FIG. 4a is that of an incident light passing through the yellow color dichroic mirror 15 and then being reflected by the red color dichroic mirror 11. The light beam passing through the red color dichroic mirror 11 is directed toward the blue color dichroic mirror 13. The spectral curves of the reflected blue light and the transmitted green light are respectively illustrated in FIG. 4b and FIG. 4c. The CIE values of three primary colors provided by the color separation beam splitter are listed in the following table, which are marked in FIG. 5 with the symbol " ".

|   | X | Y | L |
|---|---|---|---|
| R | 0.674 | 0.315 | 0.151 |
| G | 0.191 | 0.757 | 0.348 |
| B | 0.133 | 0.086 | 0.116 |

Figure 5:
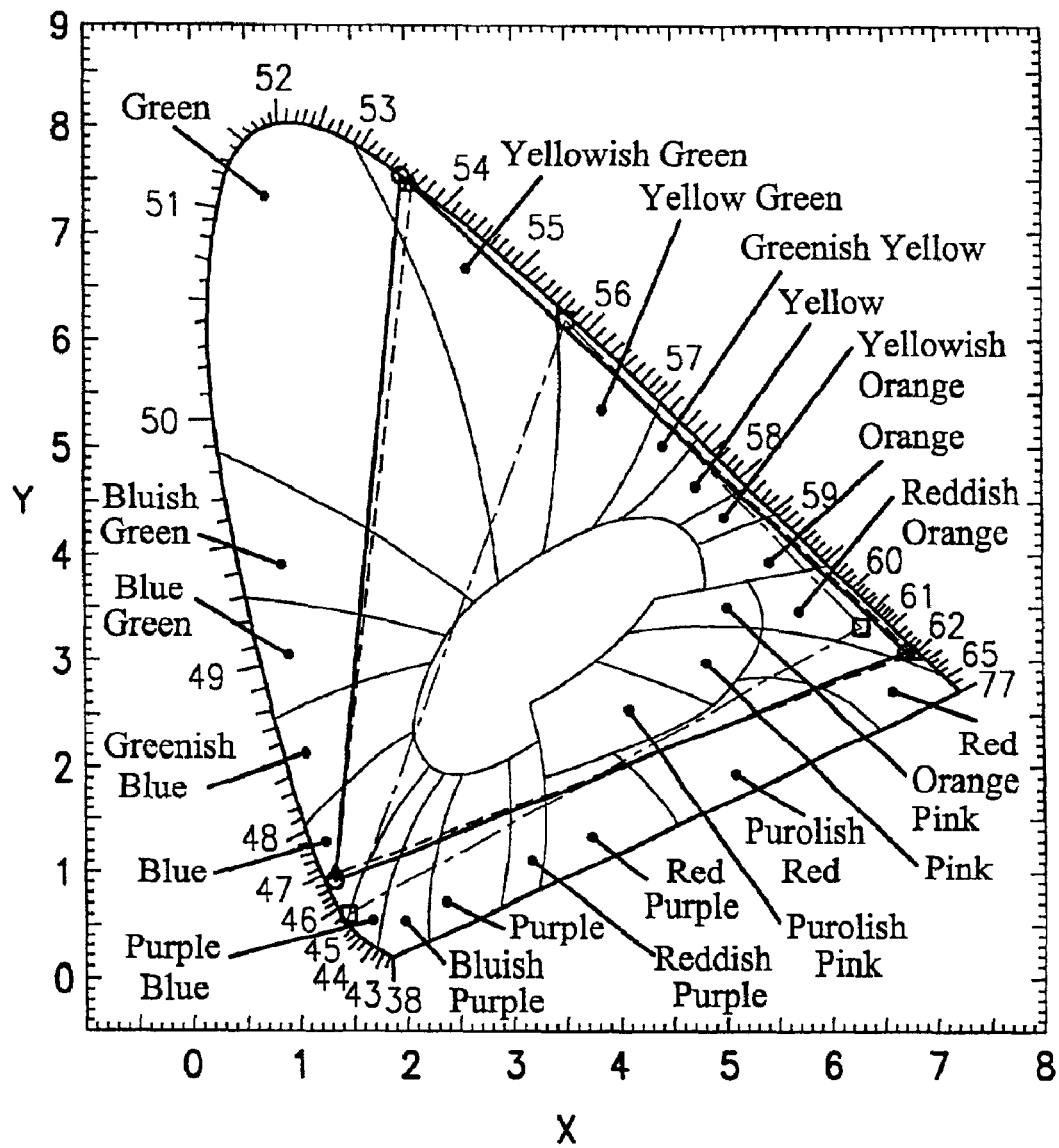
FIG. 5 shows chromatic coordinates illustrating the comparison of the color separation beam splitter of this invention and a prior-art three primary color separation beam splitter.

In order to demonstrate the performance of the color separation beam splitter of this invention, the CIE values of three primary colors provided by a prior-art OES-SXGA optical engine is also illustrated in FIG. 5 and is marked with the symbol "□". The OES-SXGA optical engine is made up of three panels of IBM 1.3" liquid crystal light valves, a X-cube beam-splitting prism and a light source of NHM-150 W.

Figure 6:
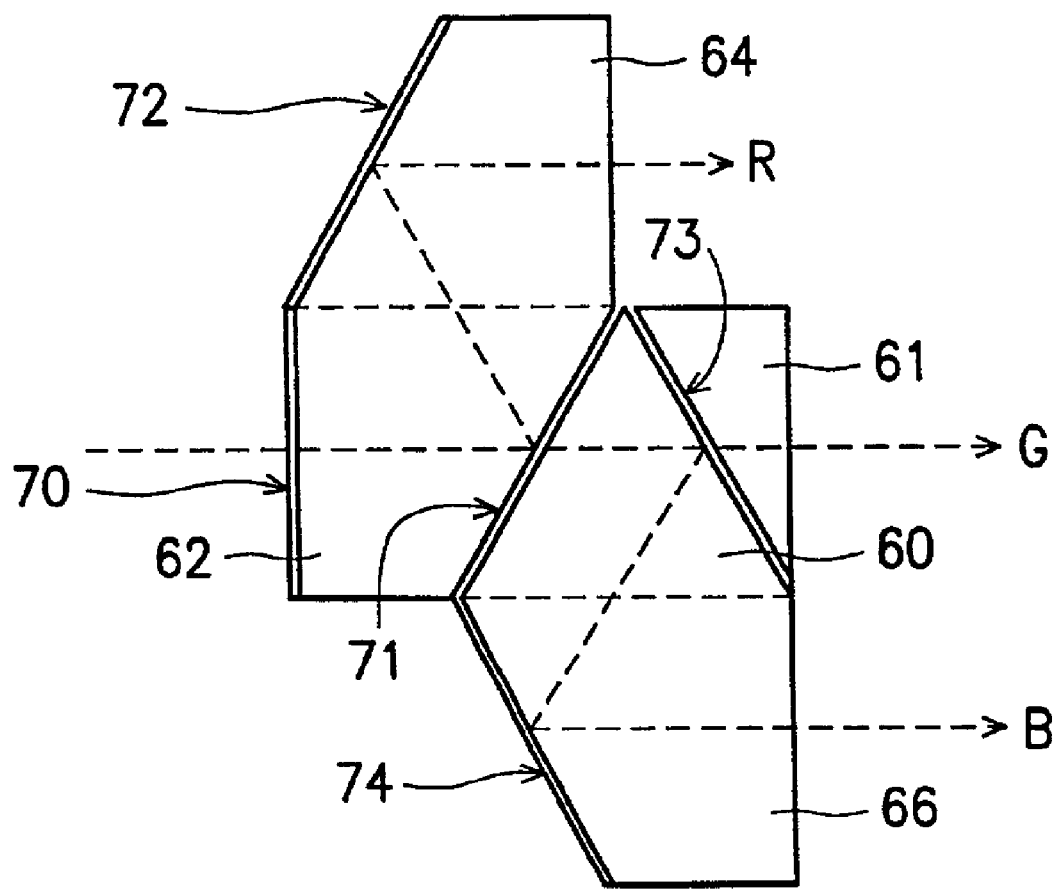
FIG. 6 illustrates the structure of the color separation beam splitter for projectors according to another embodiment of this invention.
Figure 7A:
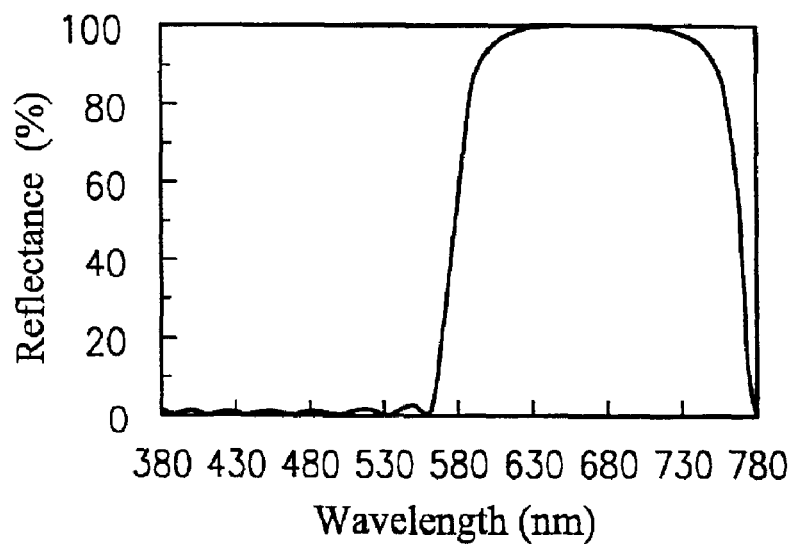
FIG. 7a is the reflective spectral curve for the red color reflective dichroic mirror.
Figure 7B:
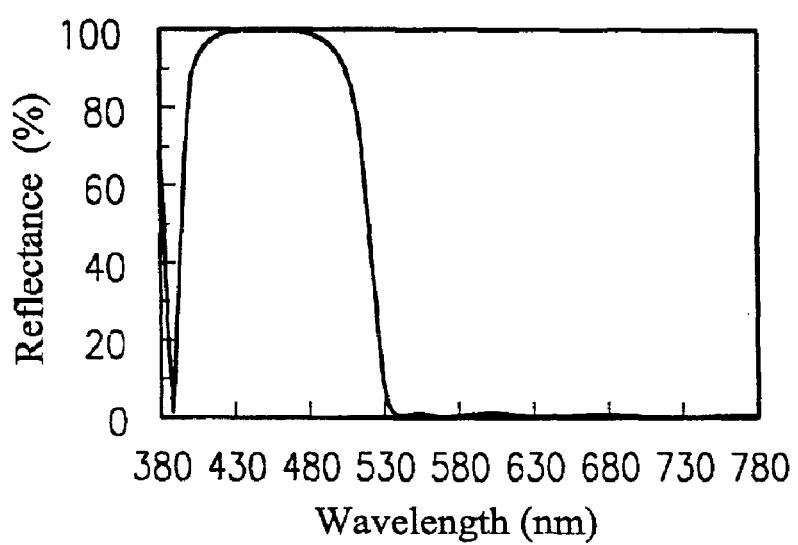
FIG. 7b is the reflective spectral curve for the blue color reflective dichroic mirror.
Figure 8A:
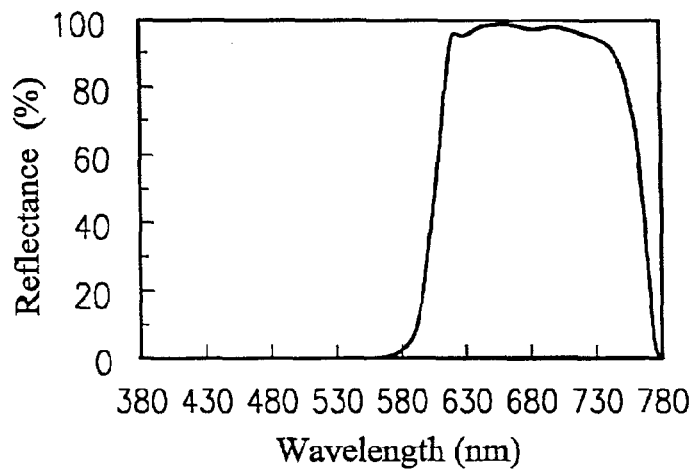
FIG. 8a is the spectral curve of the red light after being reflected twice by the multi-layer thin film in the structure of FIG. 6.
Figure 8B:
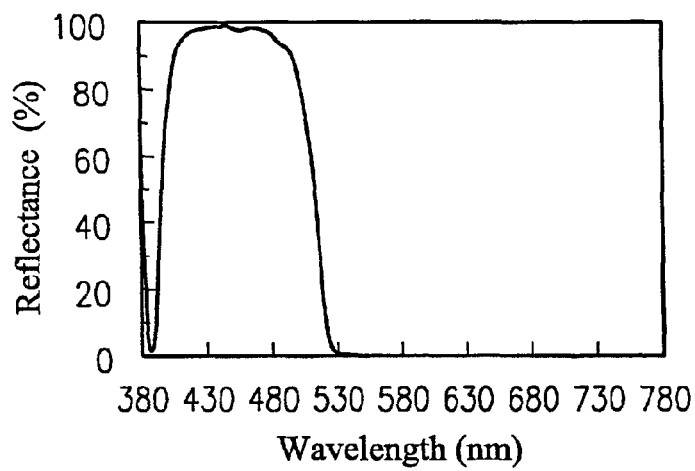
FIG. 8b is the spectral curve of the blue light after being reflected twice by the multi-layer thin film in the structure of FIG. 6.
Figure 8C:
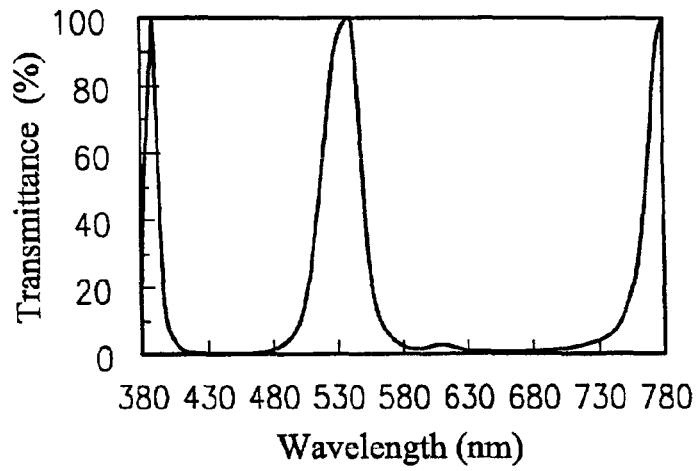
FIG. 8c is the spectral curve of the green light after passing through the red color reflective dichroic mirror and the blue color reflective dichroic mirror in the structure of FIG. 6.

According to another embodiment, instead of the right-angled prisms 22 and 26 shown in FIG. 2a, two trapezoid prisms are applied to the color separation beam splitter of FIG. 6, which includes three trapezoid prisms, a triangular prism and a right-angled prism. The 37-layer red color dichroic mirror used in the embodiment of FIG. 2a can be replaced by two 19-layer thin films 71 and 72. Similarly, the 37-layer blue color dichroic mirror used in the previous embodiment can be replaced by two 19-layer thin films 73 and 74. The reflective spectral curve of the two 19-layer thin films serving as the red color dichroic mirror is illustrated in FIG. 7a. The reflective spectral curve of the two 19-layer thin films serving as the blue color dichroic mirror is illustrated in FIG. 7b. Since the red color light is reflected by the multi-layer thin films 71 and 72, the reflective spectral curve of the red color dichroic mirror, as shown in FIG. 8a, is the product of the spectral curve of the thin film 71 and the spectral curve of the thin film 72. The blue color light is reflected by the multi-layer thin films 73 and 74. The reflective spectral curve of the blue color dichroic mirror, as shown in FIG. 8b, is the product of the spectral curve of the thin film 73 and the spectral curve of the thin film 74. The transmitted spectral curve of the blue color dichroic mirror is shown in FIG. 8c. The CIE values of three primary color lights provided by the color separation beam splitter of FIG. 6 are listed in the following table and are marked in FIG. 5 with the symbol "Δ".

|   | X | Y | L |
|---|---|---|---|
| R | 0.684 | 0.316 | 0.143 |
| G | 0.212 | 0.720 | 0.302 |
| B | 0.133 | 0.093 | 0.105 |

The performance of the dichroic prism of FIG. 6 is similar to that of FIG. 2. However, the thin film coated on the dichroic prism of FIG. 6 has only 19 layers. The cost of the dichroic prism of FIG. 6 is thus lower than that of FIG. 2.

Figure 9:
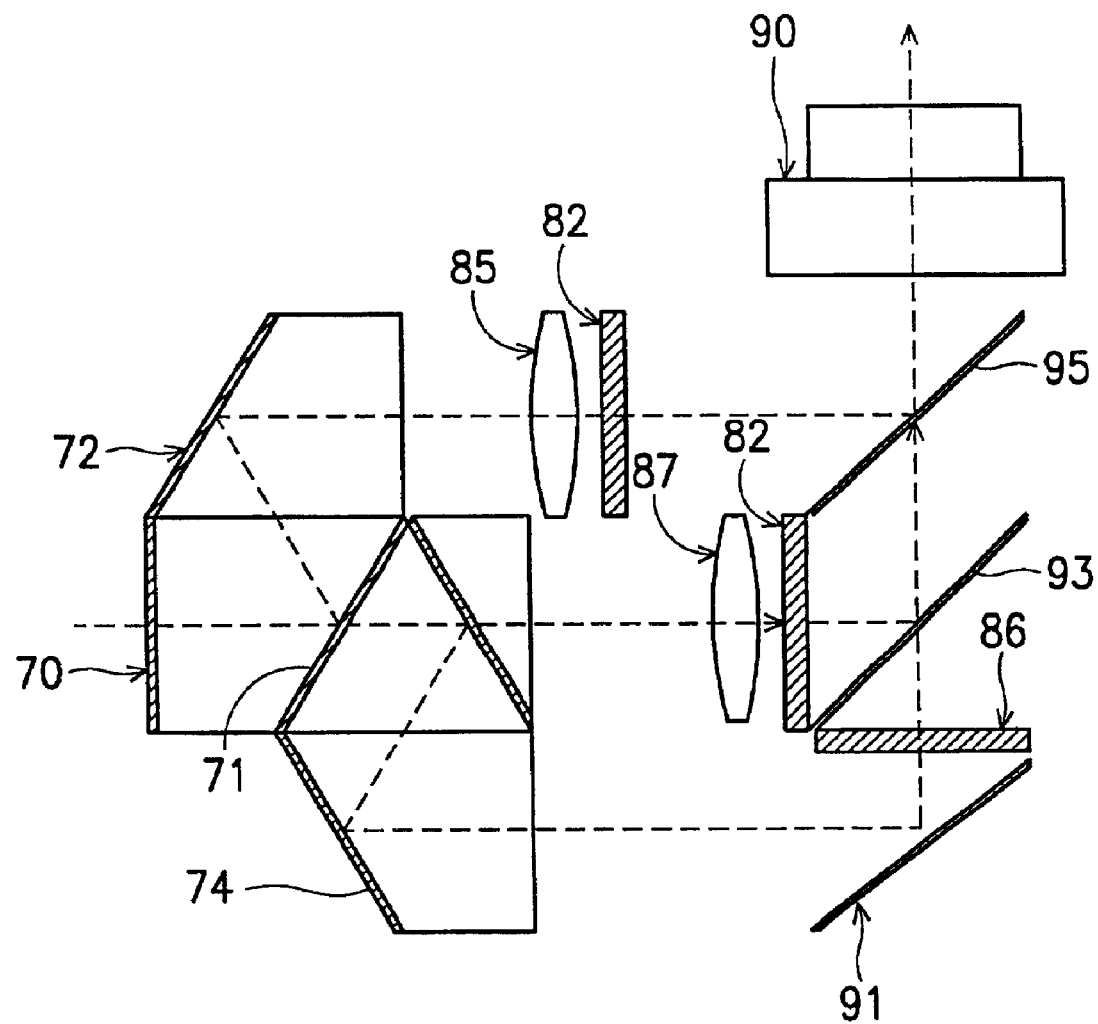
FIG. 9 illustrates the structure of the optical engine of a full color display projector using the color separation beam splitter of this invention.

The high purity color separation beam splitter of this invention can be applied to the optical engine of a full color projection display to provide an excellent color separation effect. The structure of the optical engine is illustrated in FIG. 9, in which numeral 82, 84, 86 are respectively liquid crystal light valves of red color, green color and blue color, numeral 85 and 87 are condense lenses inserted for compensating the optical path difference, numeral 91 is a reflective mirror, numerals 93 and 95 are respectively reflective dichroic mirrors of green color and red color, and numeral 90 is an objective lens set.

In the above embodiments, the performance of the color separation beam splitter can be improved by adjusting the base angles of triangular prism and trapezoid prism used to make up the beam splitter or decreasing the incident angle of light beam.

Compared with prior-art color separation beam splitters, the present invention provides the following advantages:
  (1) Since the color separation beam splitter has a simple structure and no space layer, it is easy to fabricate.
  (2) By reflecting a light beam twice, the number of layers of the dichroic mirror can be reduced. However, the color purity of the light is increased after being reflected twice by the dichroic mirrors.
  (3) The four colored light beams separated by the color separation beam splitter are parallel to each other. Thus, the color separation beam splitter can be easily combined with other optical modules to establish an optical engine system of a projector.
  (4) The position of the yellow color dichroic mirror can be adjusted so that the incidence of the light beam is oblique. In this manner, the bandwidth of the incident light beam can be adjusted to optimize the chromaticity of and the energy used in the color separation beam splitter.

Further, the present invention is not limited to the above-described embodiment, and variations and modifications may be made without departing from the scope of the present invention.

What is claimed is:

1. A color separation beam splitter for projectors comprising a plurality of prisms connected with each other and three optical interference filters having different wavelength ranges respectively formed on side surfaces of the plurality of prisms, wherein the color separation beam splitter is characterized in that the three optical interference filters include a yellow color reflective dichroic mirror which reflects pure yellow light and passes red light, blue light and green light; a red color reflective dichroic mirror which reflects pure red light and passes green light and blue light; and a blue color reflective dichroic mirror which reflects pure blue light and passes pure green light, so that when a white light is incident to the color separation beam splitter, a yellow light is first reflected by the yellow color reflective dichroic mirror, a red light is then reflected by the red color reflective dichroic mirror, and then a blue light and a green light are split by the blue color reflective dichroic mirror.

2. The color separation beam splitter as claimed in claim 1, wherein the plurality of prisms includes two triangular prisms having dichroic beam-splitting coatings formed on side surfaces corresponded to base angles of the triangular prisms; and four right-angled prisms having emerging surfaces which are perpendicular to lights emitted therefrom, in which a multi-layer thin film, which reflects yellow light, is formed on an incident surface of one of the right-angled prisms where an incident white light passes through.

3. The color separation beam splitter as claimed in claim 1 wherein the plurality of prisms include three right-angled trapezoid prisms having optical interference thin films respectively formed on the surfaces corresponding to two right-angles of the right-angled trapezoid prisms; and two right-angled prisms having emerging surfaces which are perpendicular to lights emitted therefrom.

4. The color separation beam splitter as claimed in claim 1 wherein the plurality of prisms include three right-angled trapezoid prisms having optical interference thin films respectively formed on the surfaces of the right-angled trapezoid prisms corresponding to two right-angles of the right-angled trapezoid prisms so that a red light can be reflected twice by the optical interference thin films; a multi-layer thin film reflecting yellow light formed on the incident surface of one of the right-angled trapezoid prisms where an incident white light is input; a triangular prism having an optical interference thin film formed on the surface corresponding to a base angle of the triangular prism so that a blue light is reflected twice by the optical interference thin film of the right-angled trapezoid prisms and the optical interference thin film of the triangular prism; and a right-angled, triangular prism for making a light perpendicular to an emerging surface thereof where the light is emitted from.

5. The color separation beam splitter as claimed in claim 1 wherein the yellow color reflective dichroic mirror is a multi-layer film including periodic layers of $Al_2O_3$ and $SiO_2$.

6. The color separation beam splitter as claimed in claim 1 wherein both the red color reflective dichroic mirror and the blue color reflective dichroic mirror are multi-layer films including periodic layers of $TiO_2$ and $SiO_2$.

7. The color separation beam splitter as claimed in claim 4 wherein the red light, the blue light and the green light emitted from the prisms are transmitted along a direction parallel to the incident white light.

8. A projector comprising a color separation beam splitter of claim 4 for providing lights of three primary colors; three pieces of liquid crystal light valves having the lights of three primary colors passing therethrough, respectively; three dichroic mirrors for receiving the lights of three primary colors output from the liquid crystal light valves and then transmitting the lights of three primary colors along a same direction; an objective lens for receiving and projecting the lights of three primary colors.

* * * * *